United States Patent Office 2,953,556
Patented Sept. 20, 1960

2,953,556
POLYMER RECOVERY PROCESS

John S. B. Wolfe, Rocky River, and Floyd F. Miller, Grafton, Ohio, assignors to Goodrich-Gulf Chemicals, Inc., Cleveland, Ohio, a corporation of Delaware No Drawing. Filed July 18, 1957, Ser. No. 672,580

6 Claims. (Cl. 260—94.7)

The present invention relates generally to the recovery of hydrocarbon polymers from solutions thereof in hydrocarbon solvents. More specifically, the present invention relates to the recovery of diene hydrocarbon polymers in a metal-free, crumb-like form from reaction mixtures obtained by the polymerization of conjugated diene hydrocarbons in hydrocarbon solvents containing organometallic type catalyts such as the new, heavy metal/organometallic catalysts.

In the copending application of S. E. Horne, Jr., S.N. 472,786, filed December 2, 1954 and the copending applications of C. F. Gibbs et. al., S.N. 503,027, and that of E. J. Carlson, S.N. 503,028, both field April 21, 1955, there is disclosed the production of novel, essentially all-1,4 polymers (i.e. at least about 90% of the diene units are united 1,4) of the conjugated dienes such as butadiene and isoprene. The processes of these applications involve the use of catalysts prepared by the interaction of an organometallic compound, such as a trialkyl aluminum compound, and a heavy metal compound, such as titanium tetrachloride. The product of such a polymerization process, when carried out in most hydrocarbon solvents, is a thick, viscous solution of polymer in the solvent. The solution thus obtained often is dark colored and heavily contaminated with catalyst residues. If the polymerization is carried out in n-butane as a solvent, a slurry-like product is often obtained which comprises particles of highly swollen rubber floating in a solution of low molecular weight polymer in butane. All cis-1,4 polyisoprene made in this fashion has properties similar to natural rubber. All cis-1,4 polybutadiene made by these catalysts is a superior synthetic rubber having excellent hysteresis and good low temperature properties.

Likewise, in the copending application of Hugh E. Diem et. al., S.N. 557,826, filed January 9, 1956, now U.S. 2,913,444 a polyisoprene very high in cis-1,4 content is shown to be prepared by polymerization in solution in a hydrocarbon solvent containing an alkyl lithium compound. Here also, a final product is obtained in the form of a more or less viscous, cement-like solution of polymer.

In the above and other instances, the dissolved polymer must be recovered by separation from the solvent and any impurities which may be present. For best quality, the polymer must be recovered from such solutions (1) without degradation such as cross-linking or gel-formation and without appreciable reduction in molecular weight, (2) the polymer must be recovered substantially free of metal-containing residues because even quite small quantities of the latter may adversely affect vulcanization charcteristics and the electrical properties of the polymer, and (3) although of lesser importance, the polymer should be recovered with a light color and freedom from disagreeable odors in order to be suitable for light colored stocks and to meet with good customer acceptance. Of these, avoidance of degradation and loss of molecular weight is of most fundamental importance. The latter also are most difficult to achieve.

The catalysts in any of such reaction mixtures can be "skilled" by air blowing, by contact with excess water, by addition of ammonia or an amine, or by treatment with an alcohol or alkanolamine, acetone, carboxylic acid, and the like. Oxygen, ammonia, and many of the amines precipitate the catalyst and make catalyst extraction well nigh impossible. Alcohols, alkanolamines, the lower carboxylic acids, and certain other organic compounds "kill" the catalyst and, in addition, convert it to soluble, easily-extracted products. Unfortunately, the addition of an organic compound contaminates the solvent and complicates solvent-recovery operations. Alcohols also have a serious drawback in that the solvent-soluble catalyst/alcohol reaction products are potent polymer degradation agents, particularly for the unsaturated polymers such as those of butadiene and isoprene, especially when the latter polymers are in dissolved form. Consequently, when employing alcohols, it is necessary to use large amounts under conditions that result in practically simultaneous catalyst destruction and precipitation of polymer.

An undesirable feature of many of the above-described recovery procedures based on all-organic media is that that the final polymer drying operation requires a solvent vapor recovery system operating in conjunction with the drying apparatus. Such drying apparatus is always a source of fire and explosion hazard as well as being expensive to operate. The solvent recovered in any of the steps of these all-organic work-up procedures is contaminated with organic compounds such as alcohols or acetone which are difficult to remove, especially since recycle solvent must not contain more than a few parts per million total of oxygen-containing impurities.

Another difficulty incurred when working with an all-organic recovery procedure is the difficulty in securing effective incorporation of antioxidants. Antioxidants usually are more or less soluble in hydrocarbons, alcohols, amines, acetone, and other organic liquids such that whenever a separation between polymer and the solvent and/or other organic media is effected by filtration, the organic filtrate will carry away a major proportion of the antioxidant.

In the copending applications of Floyd F. Miller et al., S.N. 602,490 and 602,491, filed August 7, 1956, the latter now U.S. 2,905,659 there are disclosed several non-organic methods of "killing" and extracting the heavy metal/organometallic catalysts. In S.N. 602,491 there is disclosed a process that employs de-oxygenated water to produce a metal-free clear solution of polymer. In 602,490, an aqueous solution of a heavy metal complexing agent such as tartaric acid followed by addition of an alkali is employed to produce a neutral solution free of color and metal-containing residues. The work-up procedures of these copending applications, however, depend primarily on non-aqueous methods for final recovery of the polymer. The latter result in solvent recycle streams contaminated with water, alcohol, etc.

It is an object of this invention to provide a water-based method for the recovery, of, or working up, of hydrocarbon polymers from solutions thereof in hydrocarbon solvents, which method is adaptable to the recovery of the polymer, irrespective of the presence or absence of metal-containing catalyst residues, and which method is readily adaptable to existing forms of synthetic rubber manufacturing equipment. It is also an object to provide such a method which will produce a stabilized polymer in a novel crumb-like form especially desirable in the newer automatic rubber compounding techniques utilizing rubber in crumb-like or particulate form.

Another and more specific object is to provide a work-up procedure especially adapted to the recovery of unsaturated polymers of butadiene-1,3 hydrocarbons from catalyst-contaminated reaction mixtures obtained by polymerization of the presence of the heavy metal/organometallic catalysts.

Other objects include the provision of a method based on water as a fire-safe medium in which the polymer is carried during the entire work-up procedure. Another object is a method which will produce a final polymer in the form of novel spherical globules of solid polymer, the latter having unique utility in operations requiring re-dissolving of the polymer, in mixing operations involving extruder type screws (such as a Banbury), and packaging, handling, weighing and/or measuring by automatic machinery. Still another object is to provide a work-up procedure permitting convenient antioxidant incorporation. A still further object is to provide synthetic rubber in the novel form of more or less spherical particles less than about 3/8 inch in diameter.

These and other objects are, according to this invention, accomplished by a method whereby a solution of a hydrocarbon polymer in a hydrocarbon solvent is mixed with a soap-containing aqueous phase and the hydrocarbon solvent distilled from the resulting mixture while efficiently agitating the water and hydrocarbon phases. Initially the polymer solution (or hydrocarbon phase or layer) seems to "break up" into fragments floating in the soapy aqueous phase. On cessation of agitation, however, the hydrocarbon layer promptly re-forms at the top of the vessel. In no case should the "soap" content of the aqueous phase be so high, nor the agitation applied be so vigorous, as to form any appreciable amount of colloidally-suspended polymer particles since these may have to be coagulated to reduce losses in subsequent filtration steps. As the distillation progresses, however, the hydrocarbon phase becomes increasingly viscous and difficult to maintain in "broken-up" or fragmentarily-suspended form. When the concentration of polymer in the hydrocarbon phase reaches somewhere in the neighborhood of 15% by weight the agitated distillation medium seems to pass through an "awkward" stage wherein stirring becomes more difficult. This lasts only a short time, however, for when the solids concentration of the hydrocarbon reaches about 30% by weight, the load on the agitator drops rapidly to a value as low or lower than the starting load. Close visual observation during these last two stages reveals that in the "awkward" phase the fragmentarily-suspended hydrocarbon phase forms itself into a number of large lumps. The lumps, however, on continued distillation and agitation, quickly "break-up" again into discrete, crumb-like appearing particles containing about 30% by weight of solid polymer and having a diameter of up to 1/2 inch. Continued distillation effects a noticeable shrinkage and hardening of the crumbs and the latter gradually assume a spherical shape with a diameter usually in the range of from about 1/64 to about 3/8 inch. The last traces of solvent are easily stripped out of the floating spheres of polymer.

The above sequence of operations occur in the manner described, providing that several critical conditions are met. One such condition is that the distillation mix, once the solids content of the hydrocarbon phase has reached 15 to 30% by weight, should at no time be cooled below about 45° C. The latter precaution is necessary to prevent irreversible agglomeration, aggregation or clotting of the normally sticky, solvent-swollen polymer with the formation of unmanageable, large masses of polymer. The polymers of the conjugated dienes are less sticky at temperatures above about 45° C. when in the presence of a hydrocarbon solvent. As will be pointed out below, as long as it is desirable in the process to handle rubbery polymers in crumb or fragmentarily-suspended form, it must not be cooled below about 45° C. lest the suspended particles fuse together and become unmanageable. This inverse temperature sensibility of the diene polymers is most unexpected since the cis-1,4 polyisoprenes and polybutadienes have excellent "tack" at room temperature. One would normally expect such materials to become more sticky at higher temperatures.

The second condition is that the soapy aqueous phase contain only the type and proportion of "soapy" materials that will fragmentarily-suspend the hydrocarbon phase. Even small proportions of the more efficient synthetic dispersants, emulsifiers, etc. can lead to the formation of hydrocarbon particles of colloidal dimensions. Fatty acid and rosin acid soaps are the materials found most effective in the process. A third of the conditions is closely allied to the second in that the agitation employed must be sufficient to fragmentarily-suspend without forming colloidal particles.

Following the "awkward phase," and as long as the mixture is maintained above about 45° C., the slurry particles can be washed repeatedly with water to remove the soap and/or other water-soluble impurities. Removal of the soap is without effect for the crumbs do not agglomerate even after repeated washing with warm water.

The slurry particles, if adequately protected by being maintained above 45° C. until dry and then covered with a coating of a lubricant or antistick agent, have a novel form. They are hard, compact spheres of polymer ranging from 1/64 to 3/8 inch in diameter or slightly smaller. Such materials will pack into a container with a minimum of waste space. If dusted with sufficient talc, soapstone, clay, bentonite clay, carbon black, zinc stearate, etc., the free-flowing character of these spherical particles can be preserved after they are cooled below about 45° C. In any case, the character of these spherical-shaped crumbs, and their lack of "tack" when warm, is of great practical importance in the final packaging step. The uncoated particles can be poured into a box or into a bag and, after cooling, a solid, coherent and compact block of polymer will be obtained which can be shipped economically. The usual procedure is either to wash-mill to sheet form or compact normally tacky-dry, crumbs unter heat and/or pressure to form a bale. These operations are dispensed with by virtue of the cold-stickiness of the crumbs of this invention.

The above-described series of operations is employed where a fairly pure polymer solution is to be treated. If metallic catalysts are present, the procedures of the above-mentioned copending applications, Ser. Nos. 602,490 and 602,491, can be employed to preliminarily "kill" and extract the catalyst. Such preliminary procedures are very easily carried out in the same equipment as is utilized for the procedures of this invention. The product of the procedure of either copending application can be blended with soapy water and subjected to distillation, according to the procedure outlined above. A simple adaptation of such preliminary procedures involves combining a stream of the catalyst-containing polymer solution and a stream of de-oxygenated water (or an aqueous tartaric acid solution) in the casing of a rapidly-rotating centrifugal pump. The two streams are subjected to violent agitation so that the hydrocarbon phase is broken up and temporarily dispersed in the water and vice versa. The result is efficient catalyst extraction. The pump-style mixer is arranged to discharge into a relatively large hold-up tank where separation of phases occurs and the aqueous (bottom) layer can be withdrawn for discard. The organic polymer-containing phase remaining in the hold-up tank can be mixed with water and agitated to wash out residual impurities. Usually, two or three such washes are adequate. The product of such a series of treatments is suitable for addition of soap and precipitation by the distillation procedure of this invention.

The solutions of polymers prepared using alkyl lithium style catalysts usually contain such small amounts of catalyst that these products can be employed in the process of the instant invention without pre-treatment of any kind.

The solutions of polymers found amenable to the process of this invention are those of the hydrocarbon polymers which are at least partially soluble in hydrocarbon solvents. The polymers of the conjugated diene hydrocarbons polymerize with organometallic style catalysts, in the great majority of cases, with the formation of substantially completely, or at least predominantly, soluble polymers. Thus, the polymer solution for use in this invention may contain polymers of butadiene; isoprene; piperylene; 2,3-dimethyl-butadiene-1,3; 2-ethyl-butadiene; 2-isopropyl-butadiene-1,3; 2-neopentyl-butadiene-1,3; mycrene; alloocimine and others; the conjugated alicyclic dienes and polyolefins such as cyclopentadiene-1,3; dimethyl fulvene; and others; and mixtures of one or more of these and/or others, or mixtures of one or more of the above with monoolefins and/or other polyolefins such as the non-conjugated polyolefins such as allene, diallyl, dimethallyl, propylallene, squalene, 1-vinyl-cyclohexene-3, divinyl benzene, and others.

Most preferred solutions for treatment according to this invention contain the polymers and interpolymers of the butadiene-1,3 hydrocarbons containing not more than 5 carbon atoms, that is, butadiene-1,3, isoprene and piperylene.

The polymer solution contains, as the solvent portion thereof, one or more hydrocarbons containing less than about 12 carbon atoms and including aliphatic hydrocarbons such as butane, pentane, hexane, heptane, octane, and the like; aromatic hydrocarbons such as benzene, toluene, xylene, and others; and cycloaliphatic materials such as cyclohexane. Particularly preferred are those hydrocarbons which have an appreciable capacity to absorb water and which combine with water to form solvent/water azeotropic mixtures which boil appreciably below the boiling point of the hydrocarbon alone. Materials meeting the latter description are benzene, xylene, and toluene. Benzene is particularly preferred because its azeotropic boiling mixture with water comprises about 91% benzene and only 9% water and boils at about 69° C., about 11° C. lower than the normal 80° C. boiling point of benzene itself.

In the solvent distillation step the amount of soap or soapy material required will vary somewhat depending on the polymer involved, on the solvent employed and to a great extent on the type of agitation employed during the distillation step. Usually, however, from about 2% by weight of soap to about 8% by weight, based on the weight of dry polymer in the polymer solution, will suffice. Any water-soluble soap or soapy material may be employed such as the soaps derived from any of the fatty acids containing about 10 or more carbon atoms. Rosin acid soaps and soaps of dehydrogenated or disproportionated rosin acid and of rosin acid esters may also be employed. The alkali-metal (including ammonium) soaps are best because of their high water-solubility. The type of soap widely employed as a polymerization emulsifier in the synthetic rubber industry is excellent for use in this invention. The free fatty acid can be employed in conjunction with sufficient alkali-metal hydroxide to generate the soap in situ. In fact, it is generally desirable to add a small amount of caustic to the soap solution to neutralize any residual acidic materials which may be extracted from the polymer during the distillation step and thus prevent loss of soap as fatty acid.

As indicated above, the normal antioxidants can readily be incorporated in the polymer in any stage of the all-water work-up procedure. A convenient procedure is to add the antioxidant along with the soap. To do so, the antioxidant can be added directly as such or it can be dissolved in or suspended in a solvent medium, preferably in the same solvent present in the polymer solution. Most of the antioxidants have a greater affinity for the organic phase and will be taken up nearly quantitatively thereby. When the solvent is distilled away the polymer will contain substantially all of the added antioxidant uniformly dispersed therein. The liquid types of antioxidants such as the heptylated diphenylamine type compounds known as "Stalite" can be emulsified in water or dissolved in solvent and then added to the distillation mixture. In either case the polymer solution will take up the antioxidant. In other cases, solutions of antioxidant in benzene/alcohol mixtures or benzene/acetone mixtures will, when added to the water-containing distillation mix, precipitate the antioxidant due to extraction of the water miscible alcohol or acetone and the antioxidant precipitate will be absorbed by the hydrocarbon layer. Suitable antioxidants include those mentioned above and others such as "B.L.E." (an acetone/diphenylamine reaction product), "Age-Rite Alba" (hydroquinone monobenzyl ether), "Age-Rite Powder" (phenyl-beta-naphthylamine), "Age-Rite White" (sym. -dibeta-naphthyl-para-phenylenediamine), "VDH" (diphenyl-para-phenylenediamine), 2,5-ditertiarybutyl hydroquinone and many others.

At the same time as the above additions, it may be convenient to add still other materials normally added to the polymer. For example, softeners and oily extending agents can be added as such since materials such as these will dissolve in the hydrocarbon solvent and will remain intimately dispersed in the polymer when the more volatile solvent is removed. Likewise, hydrocarbon-compatible solids such as carbon black can be ground in solvent and/or in oil and added to the mixture. The final polymeric product will be a partially compounded stock. If larger than normal amounts of such additives are incorporated, a crumb-like masterbatch is obtained which facilitates smooth blending with and improves dispersion of the additive in, uncompounded polymer of the same or different types.

The invention will now be described in much greater detail with reference to several specific examples which are intended as being merely illustrative.

Example I

In this example, the polymer solution treated is a crude reaction mixture, comprising the product of the polymerization of isoprene in benzene containing a catalyst prepared by reacting triisobutyl aluminum and titanium tetrachloride. The catalyst is prepared in the polymerization reactor which first had been dried, sealed and flushed with dry nitrogen. Then the required amount of dry benzene (containing about 5–10 p.p.m. of water) is added and a small amount of benzene distilled to further purge the reactor and solvent of moisture. Then about 6 milli-moles (mM.) of triisobutyl aluminum per liter of benzene and about 5 mM./liter of titanium tetrachloride are added to the reactor. Liquid isoprene sufficient to produce about 8% total solids (as polymer, at complete conversion) in the final reaction mixture, is then added. Agitation is then commenced while maintaining the temperature of the mixture at 10° C. After about 12 huors the reactor contains a very thick, dark brown solution representing, as shall be demonstrated below, a yield of all as -1,4 polyisoprene amounting to more than 95% of the isoprene charged.

The color of the above solution is derived from the catalyst and its residues. Such solution is worked up and purified by withdrawing it from the sealed reactor by means of a screw-type pump arranged to deliver its output to the vortex, or suction inlet, of an ordinary centrifugal pump. Inside the casing of the centrifugal pump the stream of viscous cement is joined by a stream of deoxygenated (or boiled) water, the water stream being of essentially equal volume and being fed to the pump suction inlet concentrically with the cement stream. Both the screw-type cement-handling pump and the centrifugal mixer pump are sealed and, together with their piping, are operated as a closed, completely-filled system. In the centrifugal pump the viscous cement is subdivided or broken up quite efficiently thereby greatly increasing the "kill" and extraction of the catalyst. The discharge outlet of the centrifugal pump is connected to a condenser- and agitator-equipped, pressure-tight vessel which will be referred to herein as the "coagulation tank." While the cement/water stream is being delivered to the tank, the agitator in the latter is operated to continue the agitation and extraction action. When about 250 gallons of cement and about 250 gallons of de-oxygenated water have been delivered in this fashion, the pumps and the tank agitator are shut off to allow separation to occur. In this fashion a nearly colorless, upper cement layer is formed along with a highly-colored lower water layer. The latter is drained off and discarded. Then 250 gallons of fresh demineralized water are added and the mixture agitated thoroughly, allowed to settle and the water again discarded. A second and third such wash is given the cement layer. At this point, the cement layer is water white, only slightly turbid due to occluded water, and essentially free of catalyst-derived metal residues.

In preparation for the distillation step about 250 gallons of fresh water are added, then 4 to 5% of a sodium fatty acid soap, based on the weight of dry polyisoprene, are added, and finally a mixed solution/dispersion of 195 grams of "Age Rite White" and 96 grams of "VDH" in benzene. The soap mentioned above is a hydrogenated tallow acid soap commonly employed as a polymerization emulsifier in the production of "GR–S" rubber. The agitator is started and the introduction directly into the mix of sparge steam at 25 p.s.i. gage is commenced to heat the mixture. When the temperature of the mix reaches about 70° C. distillate begins to appear in the condenser. The latter, comprising about 91% benzene and about 9% of water, is collected in a receiver. The introduction of steam and collection of condensate is continued, the temperature of the vapor slowly rising to about 80° C. After a considerable portion of the benzene present in the original cement charge has been removed (i.e. about 50% by volume) the load on the coagulator tank agitator motor (i.e. current load), which is noted to have increased slowly at first, increases sharply for a time and then falls quickly to a value much lower than the original value. Investigation by sampling reveals that the separate cement phase or layer has disappeared and a slurry of particles of highly swollen rubber has been formed. Distillation is continued in order to strip out the residual benzene content of the slurry particles. The latter, originally from about ⅛ to about ½ inch in diameter, are observed to shrink considerably in size. Stripping is continued until the vapor temperature reaches about 98° C. showing the virtual exhaustion of the benzene content of the slurry.

The sparge steam is cut off and the agitation is continued while the slurry is dumped out through the bottom valve in the coagulator. The slurry is dumped in this fashion into a vibratory screen before the slurry has a chance to cool appreciably. After the charge has been dumped it is found that the "coagulator" tank is clean. In the vibratory screen the soapy distillation medium is discarded and the slurry crumbs washed with warm water at about 60° C. or more. The use of warm wash water is an essential in this operation for when water at ordinary room temperatures or below is utilized in the wash step, the crumbs almost instantly coalesce into a solid mat on the screen. However, with warm water the crumbs are not sticky and the screen can be operated continuously because the crumbs flow smoothly without building up on the screen and without forming clots or lumps. The wet crumbs discharged from the screen are spread on warm drier trays and the latter placed in a vacuum drier operated at 50° C. and under a vacuum generated by a two-stage steam jet. Periodic examination of the drying crumbs reveals that when about half dry the spherical crumb particles closely resemble "fisheyes" due to their having a moist, partially opaque interior enclosed in dry, translucent rubber. The "fisheye" appearance disappears when the spheres are completely dry. The hot, dry crumbs can be poured into a polyethylene bag while warm (i.e. above about 45° C.) and allowed to cool before being compressed into a compact bale. The natural tackiness of this rubber reappears, upon cooling, permitting its compression into a very small, dense bale. The dry polymer, on examination by means of the infrared spectro-photometer, is found to be a rubbery all cis-1,4 polyisoprene. The total metal content of the rubber is found to be below about 0.08%.

Samples of the warm, dry crumbs are dusted with zinc stearate, in one case, and, in another, with soapstone. The dusted samples are then allowed to cool on the dryer tray with occasional agitation to ensure complete coating of the tacky surface. When cool the spherical crumbs are free-flowing. Such crumbs are readily adapted to automatic rubber compounding installations utilizing automatic, hopper-fed rubber dispensing-weighing machines.

*Example 2*

The procedure of Example 1 is repeated employing a solution prepared by the polymerization of commercial-grade, flash-distilled butadiene-1,3 in benzene or benzene/toluene mixtures in the presence of a catalyst prepared by combining in dry benzene (1) 0.8 millimole per liter of a finely-divided, anhydrous $CoCl_2$; (2) 0.8 millimole per liter of diisobutyl aluminum chloride, and sufficient butadiene to make about 6–8% by weight polymer in the final product. These ingredients are charged under dry nitrogen flow into a reaction vessel which has been dried and purged so as to be essentially free of oxygen and water. The reaction vessel and its contents are maintained at about 30° C. for about 24 hours while the mixture is agitated to facilitate heat transfer. At the end of this time a thick, viscous solution is obtained which is clear and nearly water white in color. As in the previous example, boiled or de-oxygenated water destroys and extracts the cobalt catalyst. The resulting clear, metal-free cement is mixed with soapy water, and distilled according to the procedure of Example 1. A fluid slurry, containing spherical polymer particles having a remarkably uniform diameter of about ⅛ inch, occurs in much the same fashion as in Example 1. The slurry is screened, washed with warm (60° C.) water and placed in a vacuum oven, all without cooling below 50° C. Portions of the spherical crumbs are cooled and then compressed into polyethylene-covered bales while other portions are dusted while still hot, with zinc stearate, talc, soapstone or other lubricant and then allowed to cool. The spherical, dusted crumbs are hard and have exceptional pre-flowing characteristics. The polymer is found to be a rubbery, all cis-1,4 polybutadiene. The metal content of this rubber is well below about 0.1%.

While there has been disclosed with considerable detail a certain preferred manner of performing this invention, it is not intended or desired to be solely limited thereto, for as hitherto stated the procedure may be modified, the precise proportions of the materials utilized may be varied, and other materials having equivalent properties may be employed, if desired, without departing from the spirit and scope of the invention as defined in the appended claims.

We claim:

1. A method of recovering a solid, rubbery, normally-tacky polymer of a conjugated diene hydrocarbon, in the form of crumbs 1/64 to ⅜ of an inch in diameter, from a solution thereof in a hydrocarbon solvent forming an azeotropic boiling mixture with water comprising the steps, in the following order, of (1) mixing the said solution with water and between about 2 and about 8% by weight on the polymer in said solution of a water-soluble fatty acid soap, (2) distilling away said solvent at a temperature above about 45° C. as an azeotrope while agitating the resulting mixture, the distillation in water step being carried out without cooling said mixture below about 45° C. and the agitation in the latter step being of a mild nature to avoid the production of a colloidal dispersion of said solution in said water, thereby to produce macro-sized particles of solvent-free solid polymer 1/64 to 3/8 inch in diameter carried in a soapy aqueous phase, and (3) separating the said particles from said aqueous phase at a temperature above about 45° C.

2. A method as defined in claim 1 wherein the crumbs separated from the said remaining aqueous phase are washed with water having a temperature above about 45° C.

3. The method as defined in claim 1 wherein an antioxidant is added to the mixture of said metal-free hydrocarbon phase, water and said soap.

4. The method of recovering a solid, rubbery, normally-tacky polymer of a butadiene-1,3 hydrocarbon containing not more than 5 carbon atoms per molecule from a reaction mixture resulting from the polymerization of said butadiene-1,3 hydrocarbon in a hydrocarbon solvent forming an azeotropic boiling mixture with water and containing a catalyst made by mixing (a) a trialkyl aluminium and (b) a titanium tetrahalide comprising the steps, in the following order, of (1) mixing the said reaction mixture with sufficient oxygen-free water to decompose the said catalyst and form a separable aqueous phase, (2) separating said aqueous phase, (3) extracting the remaining hydrocarbon phase with deoxygenated water until essentially metal free, steps 1 through 3 being carried out under an inert atmosphere for the exclusion of oxygen, (4) mixing said hydrocarbon phase with water containing from about 2 to about 8%/wt. based on the weight of polymer in said hydrocarbon phase of a water-soluble fatty acid soap, (5) distilling away said hydrocarbon solvent as said azeotrope at a temperature above about 45° C. while agitating the resulting two-phase mixture, said distillation being carried out without allowing the said two-phase mixture to cool below 45° C. and said agitation being designed to avoid emulsification of the two phases, thereby to produce a slurry of solid, polymer crumbs low in said hydrocarbon solvent in the form of particles ranging from 1/64 to 3/8 inch in diameter, and separating said soap and water from said crumbs without allowing the latter to cool below a temperature above about 45° C. thereby to obtain discrete, easily handled crumbs of polymer.

5. The method of claim 4 wherein the said solid polymer is an all cis-1,4 polyisoprene.

6. The method of claim 4 wherein the said polymer is an all cis-1,4 polybutadiene-1,3.

References Cited in the file of this patent

UNITED STATES PATENTS

| | | |
|---|---|---|
| 2,440,498 | Young et al. | Apr. 27, 1948 |
| 2,484,614 | D'Ianni | Oct. 11, 1949 |
| 2,538,273 | Rhines | Jan. 16, 1951 |
| 2,762,790 | Greene | Sept. 11, 1956 |
| 2,799,662 | Ernst et al. | July 16, 1957 |
| 2,905,659 | Miller | Sept. 22, 1959 |

OTHER REFERENCES

Fisher: Scientific American, vol. 195—No. 5, November 1956, pages 75–88 (pages 81–82 relied upon).

UNITED STATES PATENT OFFICE
CERTIFICATION OF CORRECTION

Patent No. 2,953,556                          September 20, 1960

John S. B. Wolfe et al.

It is hereby certified that error appears in the above numbered patent requiring correction and that the said Letters Patent should read as corrected below.

Column 1, line 27, for "field" read -- filed --; column 2, line 2, for '"skilled"' read -- "killed" --.

Signed and sealed this 2nd day of May 1961.

(SEAL)
Attest:

ERNEST W. SWIDER                                 DAVID L. LADD
Attesting Officer                                    Commissioner of Patents